United States Patent
Krishnaswamy et al.

(10) Patent No.: US 11,093,319 B2
(45) Date of Patent: Aug. 17, 2021

(54) AUTOMATED RECOVERY OF WEBPAGE FUNCTIONALITY

(71) Applicant: Microsoft Technology Licensing, LLC, Redmond, WA (US)

(72) Inventors: Chandramouleeswaran Krishnaswamy, Bellevue, WA (US); Mark R. Gilbert, Issaquah, WA (US); Rahul Nigam, Bothell, WA (US); Parminder Pal Singh, Redmond, WA (US); Neetha Sumana Tuluri, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 16/425,315

(22) Filed: May 29, 2019

(65) Prior Publication Data

US 2020/0379837 A1 Dec. 3, 2020

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0751* (2013.01)

(58) Field of Classification Search
CPC ............ G06F 11/0706; G06F 11/0718; G06F 11/3612; G06F 11/3636; G06F 11/366; G06F 11/3668; G06F 11/3672; G06F 11/3688
USPC ...................................................... 714/1–57
See application file for complete search history.

(56) References Cited

U.S. PATENT DOCUMENTS

| | | | |
|---|---|---|---|
| 6,317,786 B1 | 11/2001 | Yamane et al. | |
| 7,440,951 B2 | 10/2008 | Chidlovskii | |
| 8,166,135 B2 | 4/2012 | Ganesh et al. | |
| 9,135,247 B2 | 9/2015 | Li et al. | |

(Continued)

FOREIGN PATENT DOCUMENTS

| | | | |
|---|---|---|---|
| JP | 2001312429 A | 11/2001 | |
| JP | 3751277 B2 | 3/2006 | |

OTHER PUBLICATIONS

"International Search Report and Written Opinion Issued in PCT Application No. PCT/US20/029030", dated Jul 30, 2020, 14 Pages.

(Continued)

*Primary Examiner* — Sarai E Butler
(74) *Attorney, Agent, or Firm* — Michael Best & Friedrich LLP

(57) ABSTRACT

Systems and methods relate to determining whether a particular failure of a web page feature is related to a recently implemented modification, and, when applicable, automatically taking one or more actions to return the web page to a functioning state (revert the modification). One embodiment provides a system for web page recovery. The system includes at least one server including an electronic processor and memory. The memory stores instructions that, when executed by the electronic processor, cause the system to obtain a web page log, detect a failure of a feature of a web page related to the web page log, identify one or more change packages related to the web page, determine a set of possible root causes for the failure of the feature based on the one or more change packages, select one possible root cause, and revert the one possible root cause.

20 Claims, 3 Drawing Sheets

(56) References Cited

U.S. PATENT DOCUMENTS

| | | | |
|---|---|---|---|
| 9,152,731 | B2 | 10/2015 | Hu et al. |
| 9,384,119 | B2 | 7/2016 | Eickmeyer et al. |
| 2002/0156799 | A1 | 10/2002 | Markel et al. |
| 2010/0125757 | A1 | 5/2010 | Lee et al. |
| 2010/0218031 | A1* | 8/2010 | Agarwal ............. G06F 11/0709 714/2 |
| 2011/0231704 | A1* | 9/2011 | Ge ...................... G06F 11/0709 714/26 |
| 2011/0264956 | A1* | 10/2011 | Ito ...................... G06F 11/0748 714/20 |
| 2013/0318227 | A1* | 11/2013 | Feng ..................... G06F 16/958 709/224 |
| 2014/0136896 | A1* | 5/2014 | Tak ..................... G06F 11/0787 714/26 |
| 2015/0006973 | A1* | 1/2015 | Sampson ............ G06F 11/0709 714/48 |
| 2015/0248337 | A1* | 9/2015 | Adler .................. H04L 67/1095 714/4.11 |
| 2015/0332147 | A1 | 11/2015 | Anastas et al. |
| 2015/0347214 | A1* | 12/2015 | Samuni ............... G06F 11/0751 714/37 |
| 2017/0091010 | A1* | 3/2017 | Takahashi ............. G06F 11/076 |
| 2017/0208487 | A1* | 7/2017 | Ratakonda ............ H04W 24/04 |
| 2017/0262360 | A1* | 9/2017 | Kochura ............... G06F 40/194 |
| 2017/0351991 | A1* | 12/2017 | Halberstadt ...... G06Q 10/06395 |
| 2018/0196707 | A1* | 7/2018 | Gaha Tchamabe ... G06F 11/079 |
| 2019/0189113 | A1* | 6/2019 | Hecht ................... G10L 15/075 |
| 2019/0242475 | A1* | 8/2019 | Washio ............... F16H 61/0206 |

OTHER PUBLICATIONS

Yi, et al., "A Synergistic Analysis Method for Explaining Failed Regression Tests", In Proceedings of the IEEE/ACM 37th International Conference on Software Engineering, May 16, 2015, pp. 257-267.

"How to use Orchestrator to Automatically Recover Website Failures by Checking the HTTP Status Code", Retrieved from: https://social.technet.microsoft.com/wiki/contents/articles/25673.how-to-use-orchestrator-to-automatically-recover-website-failures-by-checking-the-http-status-code.aspx, Aug. 31, 2014, 8 Pages.

* cited by examiner

AUTOMATED RECOVERY OF WEBPAGE FUNCTIONALITY

FIELD OF THE DISCLOSURE

Embodiments described herein relate to systems and methods for automatically recovering functionality of a webpage when some or all of a webpage ceases functioning.

SUMMARY

In some instances, features in web pages, such as web applications, can fail. These failures may be attributable to modifications to one or more aspects of the web page, including the addition of new features. Because such modifications can be made frequently and as part of a change package including a large number of modifications (for example, a flight including a number of modifications), it is often difficult to correlate a detected failure to a particular modification. Accordingly, systems and methods disclosed herein relate to determining whether a particular failure of a web page feature is related to a recently implemented modification, and, when applicable, automatically taking one or more actions to return the web page to a functioning state (revert the modification).

For example, one embodiment provides a system for web page recovery. The system includes at least one server including an electronic processor and memory. The memory stores instructions that, when executed by the electronic processor, cause the system to obtain a web page log, detect a failure of a feature of a web page related to the web page log, and identify one or more change packages related to the web page. The instructions also cause the system to determine a set of possible root causes for the failure of the feature based on the one or more change packages, select one possible root cause, and revert the one possible root cause. The set of possible root causes can represent one or more changes to the web page included in the one or more change packages.

Another embodiment provides a method for recovering functionality of a feature of a web page in a computing environment. The method includes obtaining a web page log, detecting a failure of a feature of a web page related to the web page log, identifying one or more change packages related to the web page, determining a set of possible root causes for the failure of the feature based on the one or more change packages, ranking the set of possible root causes, thereby generating a ranked set of possible root causes, selecting one possible root cause from the ranked set of possible root causes, and reverting the one possible root cause. The set of possible root causes can represent one or more modifications to the web page included in the one or more change packages.

Yet another embodiment provides non-transitory computer-readable medium storing instructions that, when executed with an electronic processor, perform a set of functions. The set of functions includes obtaining a web page log, detecting a failure of a feature of a web page related to the web page log, identifying one or more change packages related to the web page, and determining a set of possible root causes for the failure of the feature based on the one or more change packages. The set of possible root causes can represent one or more modifications to the web page included in the one or more changes packages. The set of functions also includes ranking the set of possible root causes, thereby generating a ranked set of possible root causes, selecting one possible root cause from the ranked set of possible root causes, reverting the one possible root cause, and determining whether the feature of the web page is functional after reverting the one possible root cause.

Other aspects will become apparent by consideration of the detailed description and accompanying drawings.

DETAILED DESCRIPTION

Figure 1:
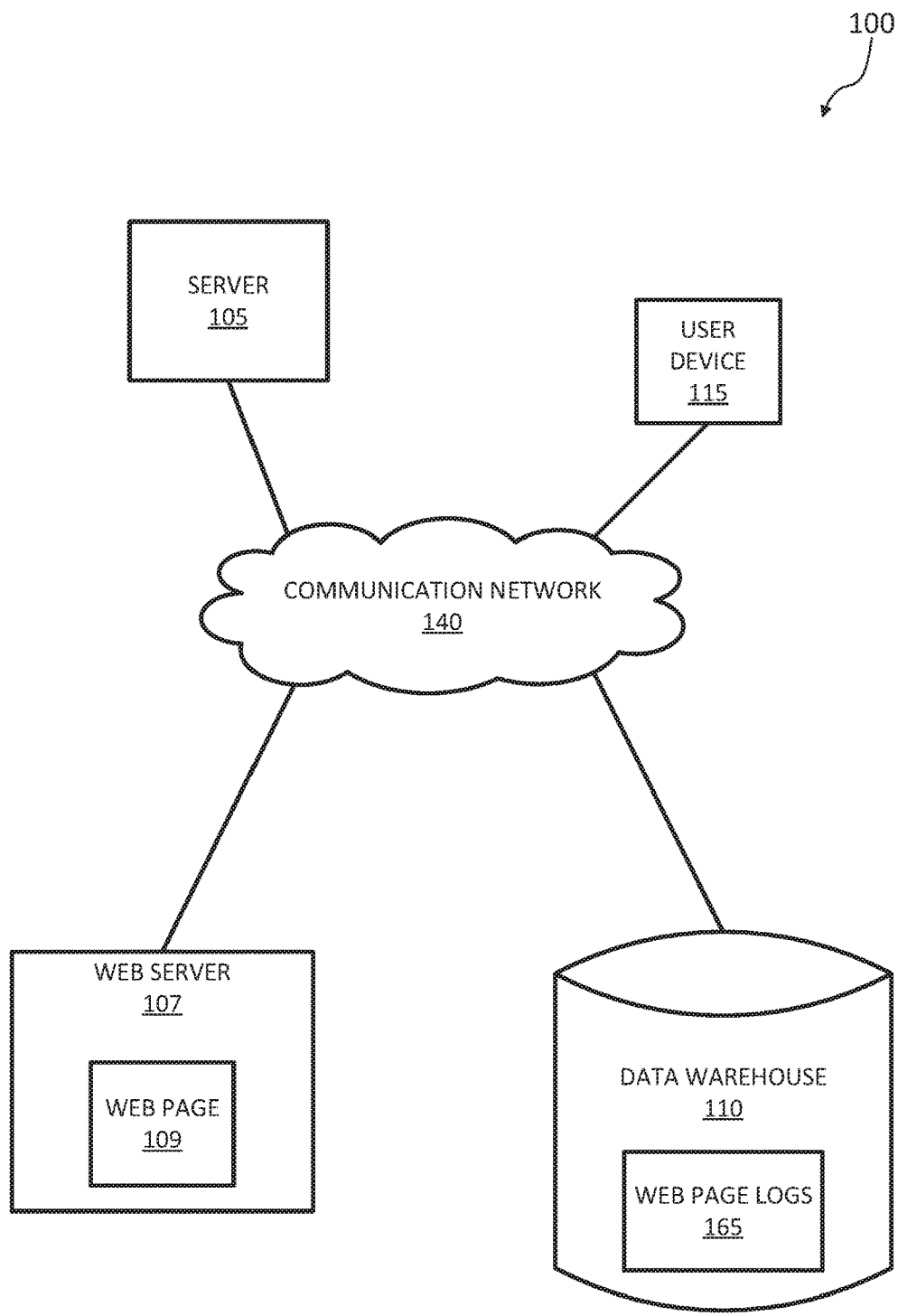
FIG. 1 schematically illustrates a computing environment according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that a not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical memory, a magnetic memory, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

When a user device requests a web page (such as a web page included as part of a web application), in some instances, part or all of the requested web page may fail to load. These failures may be attributed to a modification to the web page. In some instances, modifications to a web page may be deployed as part of a change package, which may apply to an entire web application. For example, modifications to a web page may be one or more new software features selectively deployed, referred to as "fighting," where the software features are "flighted features" or "flighted software features." As noted above, in many situations it is difficult to identify a particular modification causing a failure in a web page within a change package. Accordingly, embodiments described herein are directed, at least in part, to identifying modifications that may cause failures of a part or an entirety of a web page and recovering functional aspects of the web page.

FIG. 1 schematically illustrates a computing environment 100. The computing environment 100 includes one or more servers 105, 107, a user device 115, and a data warehouse 110. The servers 105, 107, the data warehouse 110, and the user device 115 communicate over one or more wired or wireless communication networks 140. Portions of the communication networks 140 may be implemented using a wide area network, such as the Internet, a local area network, such as a Bluetooth™ network or Wi-Fi, and combinations or derivatives thereof. It should be understood that the servers 105, 107 may communicate with any number of user devices, and a single user device 115 is shown in FIG. 1 purely for illustrative purposes. Similarly, it should also be understood that the computing environment 100 may include any number of servers and the two servers 105 and 107 shown in FIG. 1 are purely for illustrative purposes. Also, in some embodiments, the user device 115 may communicate with server 105 and/or 107 through one or more intermediary devices (not shown).

Examples of user device 115 include an electronic device, such as a smart phone, a smart watch, a tablet computer, a laptop computer, mixed reality headsets, or the like. The user device 115 communicates with one or both of the servers 105, 107 to access a web page 109, which may be provided as part of a web application, such as a file sharing service. As one example, the server 107 includes a web server, and user device 115 requests access to a webpage 109 hosted by web server 107. It will be understood that user device 115 may perform other functions and send or receive different types of communications within computing environment 100.

The data warehouse 110 stores data relating to use and access of the web page 109. The data warehouse 110 can communicate with other devices in environment 100, which can involve storing data and providing data. For instance, the data warehouse 110 can receive web page logs 165 from the web server 107 (or other servers associated with the web server 107) and store the web page logs 165. It should be understood that the data warehouse 110 can store logs for multiple different web pages although embodiments are described herein with respect to a single web page 109.

The web page logs 165 stored in the data warehouse 110 can include various data, including telemetry data. The telemetry data can include information regarding application programming interfaces (APIs) being accessed or used (relating to particular features included in the web page 109), error or failure reports or codes, time and date information, response time information, and the like relating to the functionality and operation of the web page. It should be understood that the web page log may track accesses and uses of the web page 109 by multiple users over multiple dates and times. Also, in some embodiments, the web page log may be comprised of multiple individual logs.

The data warehouse 110 can also receive and respond to data requests from devices in environment 100, such as from server 105. For example, as described in more detail below, the server 105 performs various functions to identify and correlate a failure of a feature of the web page 109. Optionally, server 105 can take one or more automatic actions to remedy the failure, including reverting the feature of the web page 109 experiencing the failure to a previous state (a previously known good or functioning state). As part of performing this function, the server 105 may communicate with the data warehouse 110, the web server 107, the user device 115, or a combination thereof. The server 105 may also be configured to provide notifications to a user device associated with a developer, such as when the server 105 correlates a detected failure of a feature of the developer's web page with a modification and, optionally, a notification when automatic actions are taken via the server 105 to remedy the detected failure.

Figure 2:
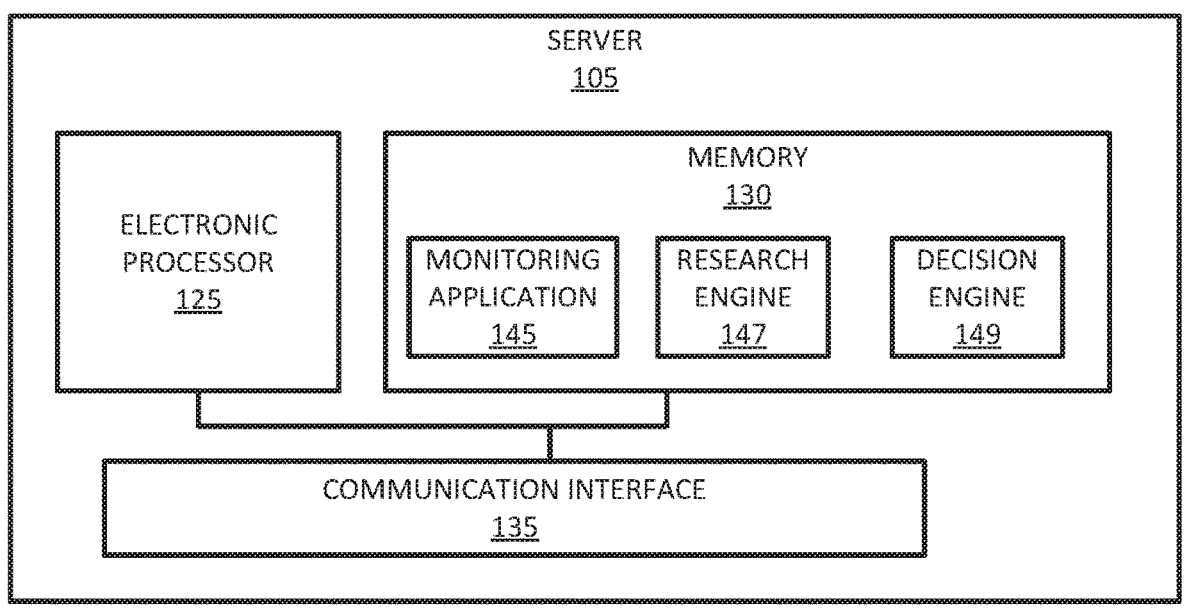
FIG. 2 schematically illustrates a server included in the computing environment of FIG. 1.

Referring now to FIG. 2, the server 105 is an electronic device that includes an electronic processor 125, a memory 130, and a communication interface 135, such as a transceiver, for communicating over the communication networks 140 and, optionally, one or more additional communication networks or connections. Examples of the electronic processor 125 include a microprocessor, application-specific integrated circuit (ASIC), or another suitable electronic device. The memory 130 is a non-transitory, computer-readable storage medium. The electronic processor 125, the memory 130, and the communication interface 135 communicate over one or more communication lines or buses. It should be understood that server 105 may include additional components than those illustrated in FIG. 2 in various configurations and may perform additional functionality than the functionality described in the present application. It should be understood that, although not described or illustrated herein, the web server 107, the data warehouse 110, and the user device 115 may include similar computing components as those shown for server 105 in FIG. 2.

The memory 130 can store various software modules providing various functionalities, and the electronic processor 125 executes instructions stored in memory 130. For example, as illustrated in FIG. 2, the memory 130 stores a monitoring application 145, a research engine 147, and a decision engine 149. In some instances, the monitoring application 145, the research engine 147, the decision engine 149, or a combination thereof are hosted on one or more, separate servers. For example, in some embodiments, the server 105 may communicate with a separate server hosting the research engine, which may, in some embodiments, include the research engine Sankie, provided by Microsoft Corporation, which is specifically programmed to address software lifecycles of large services. Similarly, in some embodiments, the server 105 may communicate with a separate server hosting the decision engine 149. It should be understood that the software components illustrated in FIG. 2 may be configured and distributed in various configurations, such as distributed among a plurality of software components.

The monitoring application 145, when executed by an electronic processor, provides detection and attribution functionalities. For example, the monitoring application 145 may be configured to obtain or access the web page logs 165 stored by data warehouse 110 based on periodic requests or on a push (real-time) notification basis. The monitoring application 145 can route a web page log 165 to particular repositories, in some instances, based on a project. The monitoring application 145 can also store a key/value pair mapping code to a feature. In some embodiments, the monitoring application 145 also has access to modifications associated with the webpage 109, such as a listing of modifications and associated time stamps, scope, extent of distribution, and the like. The monitoring application 145 may also have access to information regarding modifications regarding whether a modification is associated with a flight, is associated with a kill switch, or the like. In some embodiments, the monitoring application 145 is also configured to determine or test whether a feature of a web page is functioning, for instance, after a particular function has been reverted to a last known working state.

In some embodiments, monitoring application 145 is configured to detect failures by applying a model trained on historical web page logs associated with known failures and known successful operation. Accordingly, the monitoring application 145 may be trained using machine learning techniques to establish a baseline operation of the web page 109, which the monitoring application 145 uses to detect failures (such as an amount or frequency of failures) deviating from the baseline operation. It should be understood that a failure, as described in the present application, may include a failure of a particular feature to operate, an increased latency of a particular feature, or a decreased reliability of a particular feature.

The research engine 147, when executed by an electronic processor, provides data analysis of web page logs 165, which may be provided by the monitoring application 145. In some instances, research engine 147 analyses web page log 165 data relating to failure of a feature. As an example failure, when a user attempts to access a SharePoint™ list, which can be a name/value pair of certain items that the user is tracking, the web page indicates that the list cannot be rendered, possibly displaying a notification of "invalid exception." Web page log 165 data can include, for instance, telemetry data. As noted above, example telemetry data include log data, event data, performance data, and state data. The research engine 147 can also analyze data such as a cluster name where users are experiencing the problem and time stamps for when the problem started (which may be obtained from the monitoring application 145).

Based on data analysis, the research engine 147 generates a list of possible root causes of a failure detected by the monitoring application 145, where the possible root causes are representative of one or more modifications to the web page. In some embodiments, the research engine 147 ranks the list of possible root causes by potential relevance to the failure of the feature. In some instances, the set, or list, of possible root causes includes 10 possible root causes. Other embodiments can involve generation of more or fewer possible root causes. In some embodiments, the list of possible root causes only includes possible causes having a relevancy score satisfying a predetermined score.

The research engine 147 applies machine learning to provide the data analysis. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as an intelligent system, an artificial intelligence (AI) system, a cognitive system, or the like.

The decision engine 149, when executed by an electronic processor, takes one or more automatic actions to remedy a detected error based on the list of possible root causes identified by the research engine 147. The decision engine 149 can communicate with the monitoring application 145 and the research engine 147. For instance, the decision engine 149 can obtain a set of possible root causes for the failure of the feature of the web page (as detected by the monitoring application 145) from the research engine 147. The decision engine 149 can select a possible root cause from the set and, if applicable, revert the possible root cause. In turn, the decision engine 149 can communicate with the monitoring application 145 to determine if the failure of the feature of the web page is functional after reverting the possible root cause. The decision engine 149 can continue to revert possible root causes (selected from the set provided by the research engine 147) until a root cause is identified and, hence, the feature of the web page 109 is functional.

Reverting possible root causes can include activating a kill switch or turning off a flight for a modification to a web page. A kill switch service enables reversion from a breaking (or failing) code to its last known good version. Put another way, a kill switch undoes or turns off a recent change. In some instances, software for a webpage can include a modification behind an if/else block, which functions as a kill switch. The if/else block functions such that if the new code is active, run the new code; else, do not delete the old code and run the old code.

Reverting possible root causes can also include deactivating a flight for a modification to a web page. Turning off a flight deactivates a feature that was part of one or more new software features selectively deployed. In some instances, the default setting for a flight is "off," because the new feature(s) are slowly ramped up in exposure to users and/or only active by user consent. So if a flighted feature is related to a failure, reverting the possible root cause can include deactivating the flighted feature. In some embodiments, reverting possible root causes can also include (such as when a killswitch or flight does not exist) reverting an entire build for the web page 109 or converting to a failover version of the web page 109.

Figure 3:
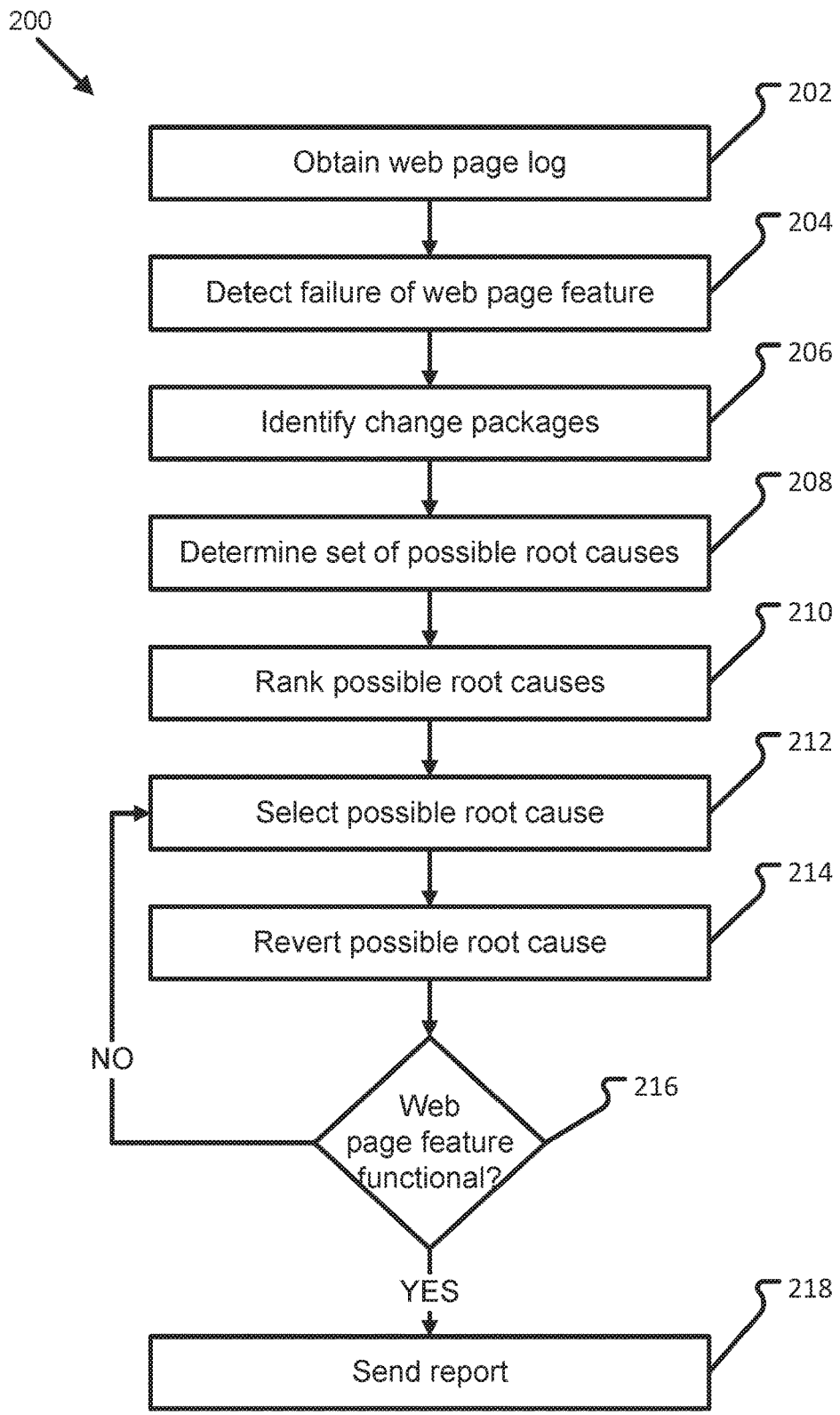
FIG. 3 is a flow chart illustrating a method for automatically recovering web page functionality in the computing environment of FIG. 1, according to one embodiment.

FIG. 3 shows an example method 200 for automatically recovering web page or web application functionality as performed by the computing environment 100 illustrated in FIGS. 1 and 2. As an overview, as illustrated in FIG. 3, the method 200 includes obtaining a web page log (at block 202), detecting a failure of a web page feature based on the web page logs (at block 204), identifying a change package potentially associated with the detected failure (at block 206), determining a set of possible root causes based on the change package (at block 208), ranking the set of possible root causes (at block 210), selecting a possible root cause from the set (at block 212), reverting the selected possible root cause (at block 214), determining whether the web page feature is functional after reverting the selected possible root cause (at block 216), and sending a report (at block 218). The method 200 is provided as one example, and, in some embodiments, the method 200 includes more or fewer operations.

The method 200 is described herein as being performed by the server 105 and, in particular, by the electronic processor 125 executing instructions (the monitoring application 145, the research engine 147, and the decision engine 149) stored on the memory 130. However, as noted above, the functionality described herein with respect to FIG. 3 may be distributed among more than one server or computing device.

As illustrated in FIG. 3, the method 200 includes obtaining a web page log for a web page (at block 202). Obtaining the web page log (at block 202) can include sending a request to the data warehouse 110. In other embodiments, a web page log is received from the data warehouse 110 (or other sources) without first sending a request for the web page log. For example, in some embodiments, the monitoring application 145 receives a real-time data feed of logs from the data warehouse 110.

After obtaining the web page log (at block 202), data in the web page log are analyzed to detect a failure of a web page feature (at block 204). Detecting a failure of web page feature (at block 204) can include analyzing telemetry data, error logs, or the like included in the web page log, to identify one or more features associated with a web page, such as web page 109, that failed.

In some instances, a determination is made whether a failure rate of the feature of the web page is less than a predetermined percentage. Example predetermined percentages can include, for instance, 10%, 20%, 30%, and 40%. In those implementations, when the failure rate is greater than the predetermined percentage, method 200 proceeds to end processes related to determining and reverting possible root causes, and sends a report to a device associated with a developer. As noted above, in some embodiments, machine learning may be used to develop a baseline for a feature of a web page, which may be used to detect when the feature is failing and would benefit from remediation.

As illustrated in FIG. 3, the method 200 also includes identifying one or more change packages associated with the web page (at block 206). Identifying the modification (at block 206) can include analyzing change log data. For example, in response to detecting the failure of the feature, a time period may be determined indicating when the failure first appeared (or first exceeded or deviated from the baseline by a predetermined amount). This time period may then be used to identify one or more change packages applied to the web page before the failure time period (for example, a predetermined amount before the failure time period). In some embodiments, identifying modifications (at block 206) can include sending a request to a change log system for a list of applicable (recent) modifications. It should be understood that a single modification to the web page 109 may include multiple, sometimes hundreds or thousands of, changes to the web page 109 implemented as a single upgrade or deployable change package.

After identifying one or more change packages (at block 206), a set of possible root causes are determined for the failing web page feature based on the package (at block 208). Determining the set of possible root causes can include analyzing data relating to the failure of the feature as well as data relating to the change packages applied to the web page 109. For example, as noted above, in some embodiments, the monitoring application 145, the decision engine 149, or both may be configured to pass the relevant web page logs and relevant change packages to the research engine 147, which may be configured (via machine learning) to correlate failures with particular possible root causes, which may be individual modifications to the web page 109 within the determined relevant changes packages. For example, as noted above, changes packages can deploy hundreds or thousands of modification for a given web page (or web application). Accordingly, although a single change package may be identified as a potential cause for a detected failure, the particular modification in the package that may be the cause of the failure may not be readily identifiable. Accordingly, the research engine 147 may be configured (at block 208) to parse through modifications in a given change package to identify those modifications that are most likely to have caused the failure.

In some instances, the set of possible root causes includes a predetermined number of possible root causes, such as 10. This predetermined number may be configurable and may also depend on a relevancy score associated with each possible root cause. For example, only possible root causes with a relevancy score (as determined by the research engine 147) above a predetermined threshold may be included in the set.

In some embodiments, the possible root causes are ranked (at block 210). Ranking the possible root causes can include generating a relevancy score for each possible root cause. A relevancy score may indicate a likelihood that the modification is related to the detected failure of the web page feature. In some instances, the relevancy score is on a scale of 1 to 100, where a score closer to 100 indicates that the possible root cause is more likely to be related to the failure or problem.

As illustrated in FIG. 3, one possible root cause is selected from the set of possible root causes (at block 212). In some embodiments, the selected possible root cause includes the root cause included in the set of possible root cause with the highest relevancy score. If applicable, the selected possible root cause is automatically reverted (at block 214). As noted above, in some embodiments, reverting the possible root cause (at block 214) includes activating a kill switch for the modification, turning off a flight for the modification, reverting a build for the web page 109, or converting to a failover state of the web page 109. By reverting the possible root cause, code for the particular modification is, in theory, returned to its last known good state (in the case of the kill switch) or effectively removed from the operation of the web page (in the case of the flight).

In some instances, reverting the possible root cause (at block 214) includes initially determining what options are available for reverting a possible root cause, such as whether a kill switch or flight is available for the modification. In some embodiments, a modification may be associated with multiple options. In these situations, the decision engine 149 may be configured to apply various thresholds to determine an option to apply for a particular modification. For example, in some embodiments, the decision engine 149 may consider the relevancy score for a possible root cause when determining how to revert the possible root cause. In particular, the relevancy score may need to exceed a particular threshold for the decision engine 149 to revert the possible root cause or revert the possible root cause in particular ways. It should be understood that, in some embodiments, such as depending on the relevancy scores with the selected possible root cause, the possible root cause may not be reverted in any way but a notification may be generated and transmitted to a developer associated with the web page 109. The notification may inform the developer of the detected failure and also one or more of the set of possible root causes, which may inform the developer of how the failure could be remedied.

After reverting the possible root cause (at block 214), a determination can be made whether the web page feature is functional (at block 216). Determining whether the web page feature is functional, or in other words, whether the failure has been remedied (at block 216) can include communicating with the monitoring application 145. In response to the web page 109 feature being functional (indicated by "YES" in FIG. 3), a report may be sent (at block 218). In some instances, the report is sent to a device associated with a developer, where the developer is related to the modification to the web page. The report can include data regarding the failure of the feature, such as the identified change packages, the identified possible root cause, the number of users that experienced the failure, the identity of the kill switch or flight activated or deactivated to remedy the problem, or the like.

In response to the web page 109 feature not being functional (indicated by "NO" in FIG. 3), method 200 returns to select another possible root cause (at block 212) from the set of possible root causes. For example, using the ranking of the possible root causes, the root cause with the second highest relevancy score may be selected. Once the additional cause is selected, the cause can be processed as described above (at blocks 214 and 216). The cycle of selecting a possible root cause (at block 212), reverting the possible root cause (at block 214), and determining whether the web page feature is functional (at block 216) can continue until either each possible root cause in the set of possible root causes is tested or until a possible root cause reversion restores functionality of the web page feature.

Thus, the embodiments described in this disclosure provide, among other things, systems and methods for correlating a failure of a feature of a web page features with a changes made to the web page and, when applicable, automatically reverting the change to remedy the failure. Accordingly, rather than issuing customer service tickets and manually fixing the failure (during which time numerous additional users may experience the same service), embodiments described herein automatically correlate failures to changes and automatically revert such changes to reduce wasted resources, reduce a number of disgruntled customers, and provide for faster mitigation of failures. For example, rather than wasting resources as a user attempts to refresh or re-access the web page with the failing feature (often repeatedly perform such a refresh or re-assess with the same result), embodiments described herein can detect and remedy failures, which, in some situations, allows a user to see remedies during a refresh or re-assess of the web page in an efficient and accurate manner.

What is claimed is:

1. A system for web page recovery, the system comprising: at least one server including: an electronic processor; and memory storing instructions that, when executed by the electronic processor, cause the system to: obtain a web page log; detect a failure of a feature of a web page related to the web page log; in response to detecting the failure of the feature of the web page, identify one or more change packages related to the web page; determine two or more possible root causes for the failure of the feature based on the one or more change packages, the two or more possible root causes representing two or more changes to the web page included in the one or more change packages; select one possible root cause from the two or more possible root causes; and revert the one possible root cause, wherein reverting the one possible root cause reverts the web page back to a last known working state.

2. The system according to claim 1, wherein the memory further stores instructions that, when executed by the electronic processor, cause the system to:
rank the two or more possible root causes, thereby generating a ranked set of possible root causes, wherein the one possible root cause is selected from the ranked set of possible root causes;
determine whether the feature of the web page is functional after reverting the one possible root cause.

3. The system according to claim 2, wherein the memory further stores instructions that, when executed by the electronic processor, cause the system to:
when the feature of the web page is not functional after reverting the one possible root cause, select a second possible root cause from the ranked set of possible root causes; and
revert the second possible root cause.

4. The system according to claim 1, wherein reverting the one possible root cause includes activating a kill switch for the one or more change packages related to the web page.

5. The system according to claim 1, wherein reverting the one possible root cause includes turning off a flight for the one or more change packages related to the web page.

6. The system according to claim 1, wherein the two or more possible root causes includes ten possible root causes.

7. The system according to claim 6, wherein the memory further stores instructions that, when executed by the electronic processor, cause the system to:
determine whether the feature of the web page is functional after reverting the second possible root cause.

8. The system according to claim 1, wherein the memory further stores instructions that, when executed by the electronic processor, cause the system to:
revert each possible root cause of the two or more possible root causes until the feature of the web page is functional.

9. The system according to claim 1, wherein the one possible root cause has a highest relevancy score of the two or more possible root causes.

10. The system according to claim 1, wherein detecting the failure of the feature of the web page includes analyzing telemetry data in the web page log.

11. The system according to claim 1, wherein the memory further stores instructions that, when executed by the electronic processor, cause the system to:
determine whether a failure rate of the feature of the web page is less than 20%; and
when the failure rate is at least 20%, end all processes related to determining and reverting possible root causes and send a report to a device associated with a developer.

12. A method for recovering functionality of a feature of a web page in a computing environment, the method comprising: obtaining a web page log; detecting a failure of a feature of a web page related to the web page tog; in response to detecting the failure of the feature of the web page, identifying one or more change packages related to the web page; determining two or more possible root causes for the failure of the feature based on the one or more change packages, the two or more possible root causes representing one two or more modifications to the web page included in the one or more change packages; ranking the two or more possible root causes, thereby generating a ranked set of possible root causes; selecting one possible root cause from the ranked set of possible root causes; and reverting the one possible root cause, wherein reverting the one possible root cause reverts the web page back to a last known working state.

13. The method according to claim 12, further comprising:
determining whether the feature of the web page is functional after reverting the one possible root cause.

14. The method according to claim 13, further comprising:
when the feature of the web page is not functional after reverting the one possible root cause, selecting a second possible root cause from the ranked set of possible root causes;
reverting the second possible root cause; and
determining whether the feature of the web page is functional after reverting the second possible root cause.

15. The method according to claim 14, further comprising:
reverting each possible root cause of the two or more possible root causes until the feature of the web page is functional.

16. The method according to claim 15, wherein reverting the one possible root cause includes activating a kill switch for the one or more change packages to the web page or turning off a flight for the one or more change packages to the web page.

17. Non-transitory computer-readable medium storing instructions that, when executed by an electronic processor, perform a set of functions, the set of functions comprising: obtaining a web page log; detecting a failure of a feature of a web page related to the web page log; in response to detecting the failure of the feature of the web page, identifying one or more change packages related to the web page; determining two or more possible root causes for the failure of the feature based on the one or more change packages, the two or more possible root causes representing one two or more modifications to the web page included in the one or more changes packages; ranking the two or more possible root causes, thereby generating a ranked set of possible root causes; selecting one possible root cause from the ranked set of possible root causes; reverting the one possible root cause, wherein reverting the one possible root cause reverts the web page back to a last know working state; and determining whether the feature of the web page is functional after reverting the one possible root cause.

18. The non-transitory computer-readable medium according to claim 17, wherein reverting the one possible root cause includes activating a kill switch for the one or more change packages to the web page or turning off a flight for the one or more change packages to the web page; and wherein the one possible root cause has a highest relevancy score in the two or more possible root causes.

19. The non-transitory computer-readable medium according to claim 18, the set of functions further comprising:
when the feature of the web page is not functional after reverting the one possible root cause, selecting a second possible root cause from the ranked set of possible root causes;
reverting the second possible root cause; and
determining whether the feature of the web page is functional after reverting the second possible root cause.

20. The non-transitory computer-readable medium according to claim 19, wherein the two or more possible root causes includes ten possible root causes; and
wherein detecting the failure of the feature of the web page includes analyzing telemetry data in the web page log.

* * * * *